United States Patent
McFarland (10) Patent No.: US 10,549,704 B2
(45) Date of Patent: Feb. 4, 2020

(54) COLD FORMED GLASS APPLIQUE

(71) Applicant: CORNING INCORPORATED, Corning, NY (US)

(72) Inventor: Michael James McFarland, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/324,153

(22) PCT Filed: Jul. 10, 2015

(86) PCT No.: PCT/US2015/039871
§ 371 (c)(1),
(2) Date: Jan. 5, 2017

(87) PCT Pub. No.: WO2016/007815
PCT Pub. Date: Jan. 14, 2016

(65) Prior Publication Data
US 2017/0197561 A1    Jul. 13, 2017

Related U.S. Application Data (60) Provisional application No. 62/022,982, filed on Jul. 10, 2014.

(51) Int. Cl.
*B60R 13/04*    (2006.01)
*B44C 5/04*    (2006.01)
*B32B 17/06*    (2006.01)

(52) U.S. Cl.
CPC ............ *B60R 13/04* (2013.01); *B32B 17/061* (2013.01); *B32B 17/064* (2013.01); *B44C 5/0407* (2013.01); *Y10T 428/315* (2015.01)

(58) Field of Classification Search
CPC ............... B32B 17/061; B32B 17/064; B32B 17/10018; B32B 17/10293;
(Continued)

(56) References Cited

U.S. PATENT DOCUMENTS 4,198,452 A    4/1980 Olcott et al.
4,400,419 A *  8/1983 Laczynski ................ B41M 3/12
                                                156/233
(Continued)

FOREIGN PATENT DOCUMENTS

CN    101684032 A    3/2010
DE    2203387         8/1973
(Continued)

OTHER PUBLICATIONS

Machine translation of JP 2007/197288 A, obtained from Industrial Property Digital Library of the JPO on Jun. 20, 2017.*
(Continued)

*Primary Examiner* — Z. Jim Yang
(74) *Attorney, Agent, or Firm* — John P. Ciccarelli (57) ABSTRACT

Disclosed herein are applique assemblies (200) comprising a substrate (210) comprising a first non-planar surface (220) defining a recess and a glass sheet (230) having a thickness of less than about 3 mm, wherein the glass sheet is configured to fit within the recess, and further wherein the glass sheet is cold formed to conform to the first non-planar surface. The applique assembly may include a chemically strengthened or non-chemically strengthened glass sheet having a thickness ranging from about 0.1 mm to about 2 mm. The applique assembly may be used to cover structural elements on the exterior of a vehicle.

17 Claims, 5 Drawing Sheets

(58) Field of Classification Search
CPC ......... B32B 17/10302; B32B 17/10247; Y10T 428/315; B60R 13/04; B60R 13/043
See application file for complete search history.

(56) References Cited

U.S. PATENT DOCUMENTS

| | | | |
|---|---|---|---|
| 4,483,700 A | 11/1984 | Forke, Jr. et al. | |
| 4,498,697 A * | 2/1985 | McGlone | B60R 13/04 293/128 |
| 4,645,556 A * | 2/1987 | Waugh | B41M 1/30 156/242 |
| 4,707,008 A * | 11/1987 | Falco | B60R 13/04 293/128 |
| 4,765,253 A * | 8/1988 | Schappach | A47B 3/06 108/158.12 |
| 4,768,037 A * | 8/1988 | Inaba | B32B 17/10 343/713 |
| 4,828,302 A * | 5/1989 | Marasigan, Jr. | B60R 13/04 280/770 |
| 4,830,892 A * | 5/1989 | Nussbaum | B29C 45/14467 156/293 |
| 4,865,919 A * | 9/1989 | Frank | B60J 1/008 428/410 |
| 4,899,507 A | 2/1990 | Mairlot | |
| 4,952,462 A * | 8/1990 | Bright | A47B 13/08 428/542.2 |
| 5,092,078 A | 3/1992 | Keys | |
| 5,277,952 A * | 1/1994 | Watras | B28D 5/0029 428/46 |
| 5,312,145 A * | 5/1994 | McNeil | B60J 11/06 29/428 |
| 5,373,672 A * | 12/1994 | Schulz | B32B 17/10045 52/235 |
| 5,674,790 A | 10/1997 | Araujo | |
| RE36,457 E | 12/1999 | Ellison et al. | |
| 6,132,821 A * | 10/2000 | Garr | A63H 9/00 428/15 |
| 6,409,256 B1 | 6/2002 | Page | |
| 6,416,113 B1 * | 7/2002 | Page | B60J 5/0402 296/146.1 |
| 6,740,390 B2 | 5/2004 | Randazzo | |
| 6,815,070 B1 | 11/2004 | Burkle et al. | |
| 7,396,071 B2 | 7/2008 | Teng | |
| 7,666,511 B2 | 2/2010 | Ellison et al. | |
| 8,169,684 B2 * | 5/2012 | Bugno | B60R 1/088 359/265 |
| 8,360,493 B2 | 1/2013 | Gerndorf et al. | |
| 8,388,039 B2 | 3/2013 | Gerndorf et al. | |
| 8,400,265 B2 | 3/2013 | Sarioglu et al. | |
| 8,986,072 B2 | 3/2015 | Darcangelo et al. | |
| 2003/0077417 A1 | 4/2003 | Hasecke et al. | |
| 2004/0229668 A1* | 11/2004 | Lin | H04M 1/0283 455/575.3 |
| 2005/0235698 A1* | 10/2005 | Siskos | C03B 23/0252 65/106 |
| 2007/0094905 A1* | 5/2007 | Thompson | G09F 7/00 40/599 |
| 2008/0189999 A1* | 8/2008 | Peterman | G09F 1/10 40/593 |
| 2008/0286548 A1* | 11/2008 | Ellison | C03B 17/06 428/220 |
| 2009/0136691 A1* | 5/2009 | Suzuki | B44C 1/105 428/31 |
| 2009/0225561 A1* | 9/2009 | Kleber | B60Q 1/50 362/485 |
| 2010/0000259 A1* | 1/2010 | Ukrainczyk | C03B 23/0235 65/104 |
| 2010/0011641 A1* | 1/2010 | Hill | G09F 1/06 40/606.12 |
| 2010/0285260 A1 | 11/2010 | Bookbinder et al. | |
| 2010/0321758 A1* | 12/2010 | Bugno | B60R 1/088 359/267 |
| 2011/0045228 A1* | 2/2011 | Aravamudan | B44C 1/26 428/67 |
| 2011/0249458 A1* | 10/2011 | Kleber | G09F 13/08 362/473 |
| 2011/0272974 A1* | 11/2011 | Labrot | B32B 17/10036 296/215 |
| 2012/0076958 A1* | 3/2012 | Szymberski | B60R 13/005 428/31 |
| 2012/0091751 A1 | 4/2012 | Zimmer et al. | |
| 2012/0094084 A1 | 4/2012 | Fisher et al. | |
| 2012/0194974 A1* | 8/2012 | Weber | C03C 21/002 361/679.01 |
| 2012/0268961 A1* | 10/2012 | Cammenga | B60R 1/088 362/516 |
| 2012/0327567 A1* | 12/2012 | Shedletsky | C03C 17/3441 361/679.01 |
| 2012/0328843 A1 | 12/2012 | Cleary et al. | |
| 2013/0020007 A1 | 1/2013 | Niiyama et al. | |
| 2013/0071601 A1* | 3/2013 | Bibl | B32B 3/02 428/67 |
| 2013/0086948 A1 | 4/2013 | Bisson et al. | |
| 2013/0101980 A1* | 4/2013 | Domey | B43L 1/008 434/408 |
| 2013/0125589 A1 | 5/2013 | Dannoux et al. | |
| 2013/0125592 A1 | 5/2013 | Bisson | |
| 2013/0127202 A1 | 5/2013 | Hart | |
| 2013/0128433 A1* | 5/2013 | Dannoux | H05K 5/00 361/679.01 |
| 2013/0140840 A1 | 6/2013 | Schulte et al. | |
| 2013/0183512 A1* | 7/2013 | Gy | C03C 21/002 428/220 |
| 2013/0295357 A1 | 11/2013 | Clean et al. | |
| 2013/0319046 A1 | 12/2013 | Cleary et al. | |
| 2013/0323415 A1 | 12/2013 | Brackley et al. | |
| 2013/0323465 A1* | 12/2013 | Wang | C03B 11/14 428/141 |
| 2013/0330495 A1* | 12/2013 | Maatta | B23P 11/00 428/68 |
| 2014/0014260 A1 | 1/2014 | Chowdhury et al. | |
| 2014/0036338 A1* | 2/2014 | Bareman | G02F 1/157 359/267 |
| 2014/0049949 A1 | 2/2014 | Spurgeon | |
| 2014/0087159 A1 | 3/2014 | Cleary et al. | |
| 2014/0087193 A1 | 3/2014 | Cites et al. | |
| 2014/0141206 A1* | 5/2014 | Gillard | B32B 17/10036 428/174 |
| 2014/0141217 A1 | 5/2014 | Gulati et al. | |
| 2014/0228080 A1* | 8/2014 | Choi | B29C 45/14639 455/575.1 |
| 2014/0239034 A1 | 8/2014 | Cleary et al. | |
| 2014/0308464 A1* | 10/2014 | Levasseur | B23P 11/025 428/34 |
| 2014/0312518 A1 | 10/2014 | Levasseur et al. | |
| 2014/0356604 A1 | 12/2014 | Borrelli et al. | |
| 2015/0032328 A1* | 1/2015 | Healey | B60Q 1/503 701/36 |
| 2015/0064374 A1 | 3/2015 | Jain et al. | |
| 2015/0085429 A1* | 3/2015 | Memering | G06F 1/16 361/679.01 |
| 2015/0085432 A1* | 3/2015 | Memering | G06F 1/1626 361/679.01 |
| 2015/0132538 A1 | 3/2015 | Cleary et al. | |
| 2015/0093539 A1* | 4/2015 | Krugmann | B32B 17/10036 428/99 |
| 2015/0111016 A1 | 4/2015 | Fisher et al. | |
| 2015/0122406 A1 | 5/2015 | Fisher et al. | |
| 2015/0140301 A1 | 5/2015 | Fisher et al. | |
| 2015/0158275 A1 | 6/2015 | D'Errico et al. | |
| 2015/0158277 A1 | 6/2015 | Fisher et al. | |
| 2015/0179970 A1* | 6/2015 | Zhang | H01L 51/524 257/40 |
| 2015/0232366 A1 | 8/2015 | Fredholm et al. | |
| 2015/0232367 A1 | 8/2015 | Joubaud et al. | |
| 2015/0251377 A1 | 9/2015 | Cleary et al. | |
| 2015/0274571 A1 | 10/2015 | Brennan et al. | |
| 2015/0321940 A1 | 11/2015 | Dannoux et al. | |

(56) References Cited

U.S. PATENT DOCUMENTS

| | | |
|---|---|---|
| 2016/0031737 A1* | 2/2016 | Hoppe ............... C03B 23/0086 |
| | | 428/187 |
| 2016/0082705 A1 | 3/2016 | Fisher et al. |
| 2016/0145139 A1 | 5/2016 | Fredholm et al. |
| 2016/0207290 A1 | 7/2016 | Cleary et al. |
| 2016/0207819 A1 | 7/2016 | Cleary et al. |
| 2016/0207820 A1 | 7/2016 | Cleary et al. |
| 2016/0250825 A1 | 9/2016 | Cleary et al. |
| 2017/0113628 A1* | 4/2017 | Sugiura ............... B60R 13/005 |

FOREIGN PATENT DOCUMENTS

| | | | |
|---|---|---|---|
| DE | 3737736 | | 5/1989 |
| DE | 20201528 U1 | | 7/2003 |
| DE | 102007058272 | | 6/2009 |
| EP | 1046493 B1 | | 9/2006 |
| EP | 1889749 | | 9/2008 |
| EP | 2475938 A1 | | 7/2012 |
| EP | 1695808 | | 3/2013 |
| EP | 2363324 | | 5/2013 |
| GB | 2334064 | | 8/1999 |
| JP | 2007197288 A | * | 8/2007 ....... B32B 17/10036 |
| JP | 2013248911 A | | 12/2013 |
| WO | 1998001649 | | 1/1998 |
| WO | 2014098160 A1 | | 6/2014 |

OTHER PUBLICATIONS www.icionline.com, downloaded Mar. 20, 2017.
www.qaausa.com, downloaded Mar. 20, 2017.
www.superiordash.com, downloaded Mar. 20, 2017.
www.willmore.com, downloaded Mar. 20, 2017.
www.wowtrim.com, downloaded Mar. 20, 2017.
http://www.duraauto.com/products/exterior-systems/exterior-trim, downloaded Mar. 20, 3017.
http://www.kraiburg-tpe.com/us/news_press/archives/pillar-cappings, downloaded Mar. 20, 2017.
Patent Cooperation Treaty International Notification of Transmittal of the International Search Report and the Written Opinion of the International Searching Authority, international application No. PCT/US2015/039871: dated Oct. 15, 2015, 11 pages.
English Translation of JP2017501196 Office Action dated Mar. 27, 2019; 3 Pages; Japanese Patent Office.
Japanese Patent Application No. 2017501196; Machine Translation of the Office Action Dated Nov. 21, 2019; Japan Patent Office; 4 Pgs.

* cited by examiner

COLD FORMED GLASS APPLIQUE

This application claims the benefit of priority under 35 U.S.C. § 365 of International Patent Application Serial No. PCT/US15/39871 filed on Jul. 10, 2015 which also claims the benefit of priority under 35 U.S.C. § 119 of U.S. Provisional Application Ser. No. 62/022,982 filed on Jul. 10, 2014 the content of which are relied upon and incorporated herein by reference in their entirety.

FIELD OF THE DISCLOSURE

Disclosed herein are decorative covers or appliques for the external surfaces of vehicles such as cars and, more particularly, cold-formed glass/plastic appliques including a chemically strengthened or non-chemically strengthened glass sheet.

BACKGROUND

An applique is a decorative member or cover which may be attached to a vehicle surface to add styling and/or to functionally cover portions of the vehicle which may be otherwise aesthetically unpleasing. For instance, a pillar may provide support to the roof of a vehicle and may be covered by a decorative applique. Where the glazing meets the frame elements of the vehicle, such as at the pillars, non-viewing regions may be created which may be covered so as to present a harmonious external surface appearance.

Recently, there has been an increased demand in the automotive industry for the use of glass on the external surfaces of vehicles to increase the aesthetics of the vehicle and/or to increase the visibility of the exterior surroundings for the passengers. The use of glass appliques may enhance the visual aspects of the vehicle because, e.g., the pillars may be covered with glass elements so as to match the adjacent windows. To improve breakage safety, glass may be thermally tempered in which case thicker glass may be required. However, the use of such thicker glass has the disadvantage of adding weight to the vehicle which, in turn, can reduce fuel efficiency, increase emissions, and/or raise the center of gravity of the vehicle. Moreover, to match the overall shape of the vehicle exterior, the glass may also be thermally shaped or molded, which increases the vehicle production cost.

Because of the cost and weight issues associated with glass appliques, conventional appliques are typically constructed from metal and/or plastic. However, these appliques are not without their drawbacks. Plastic exterior elements can have reduced environmental durability and can be prone to scratching, fading, peeling, and/or discoloration. Painted metal elements can be durable, but they do not match the surrounding glass which may thwart the overall intended vehicle design aesthetic.

Accordingly, it would be advantageous to provide an applique assembly including a glass surface which does not suffer from the weight disadvantage associated with thicker glasses. It would also be advantageous to provide such appliques which do not require thermal processing to match the shape of the vehicle such that the cost disadvantage as compared to traditional plastic and/or metal parts can be reduced or eliminated.

SUMMARY

The disclosure relates, in various embodiments, to an applique assembly comprising a substrate comprising a first non-planar surface defining a recess, and a glass sheet having a thickness of less than about 3 mm, wherein the glass sheet is configured to fit within the recess, and further wherein the glass sheet is cold formed to conform to the first non-planar surface.

In certain non-limiting embodiments, the glass sheet may be chosen from aluminosilicate, alkali-aluminosilicate, borosilicate, alkali-borosilicate, aluminoborosilicate, and alkali-aluminoborosilicate glasses. The glass sheet may, in various embodiments, be chemically strengthened. In further embodiments, the glass sheet may have a thickness ranging from about 0.1 mm to about 2 mm, such as from about 0.3 mm to about 1.5 mm, or from about 0.5 mm to about 1 mm. The glass sheet can, in certain embodiments, have a compressive stress greater than about 100 MPa and a depth of layer of compressive stress (DOL) greater than about 10 microns, for example, a compressive stress greater than about 700 MPa and a DOL greater than about 40 microns.

According to other non-limiting embodiments, the substrate may be chosen from metal and plastic substrates, such as molded or extruded plastic substrates. The substrate may include a recess comprising a groove having a depth substantially equal to, for example, minimally greater than, the thickness of the glass sheet. In various embodiments, the glass sheet and substrate are attached using an adhesive layer or other interlayer. In yet further embodiments, the glass sheet and substrate are not adhered together. For example, the glass sheet and substrate may be otherwise held together, e.g., using frictional forces.

The applique assembly disclosed herein may be used, for instance, as a decorative cover for a vehicle, such as a car, truck, bus or boat, to name a few. The substrate may, for example, comprise a second surface which can be attached to an exterior surface of the vehicle, such as a vehicle pillar. The applique assembly, e.g., portions of the assembly such as the glass sheet may comprise one or more surfaces which may or may not be covered with a decorative and/or anti-splinter film. According to various embodiments, a functional element, such as a light source, antenna, sensor, or indicator, may be present within or behind the applique assembly.

Additional features and advantages will be set forth in the detailed description which follows, and in part will be readily apparent to those skilled in the art from that description or recognized by practicing the methods described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding, and are incorporated into and constitute a part of this specification. The drawings illustrate various non-limiting embodiments and together with the description serve to explain the principles and operations of the disclosure.

BRIEF DESCRIPTION OF THE DRAWINGS

Various features, aspects and advantages of the present disclosure are better understood when the following detailed description is read with reference to the accompanying drawings wherein like structures are indicated with like reference numerals when possible, in which.

DETAILED DESCRIPTION

Disclosed herein are applique assemblies comprising a substrate comprising a first non-planar surface defining a recess and a glass sheet having a thickness of less than about 3 mm, wherein the glass sheet is configured to fit within the recess, and further wherein the glass sheet is cold formed to conform to the first non-planar surface.

Figure 1:
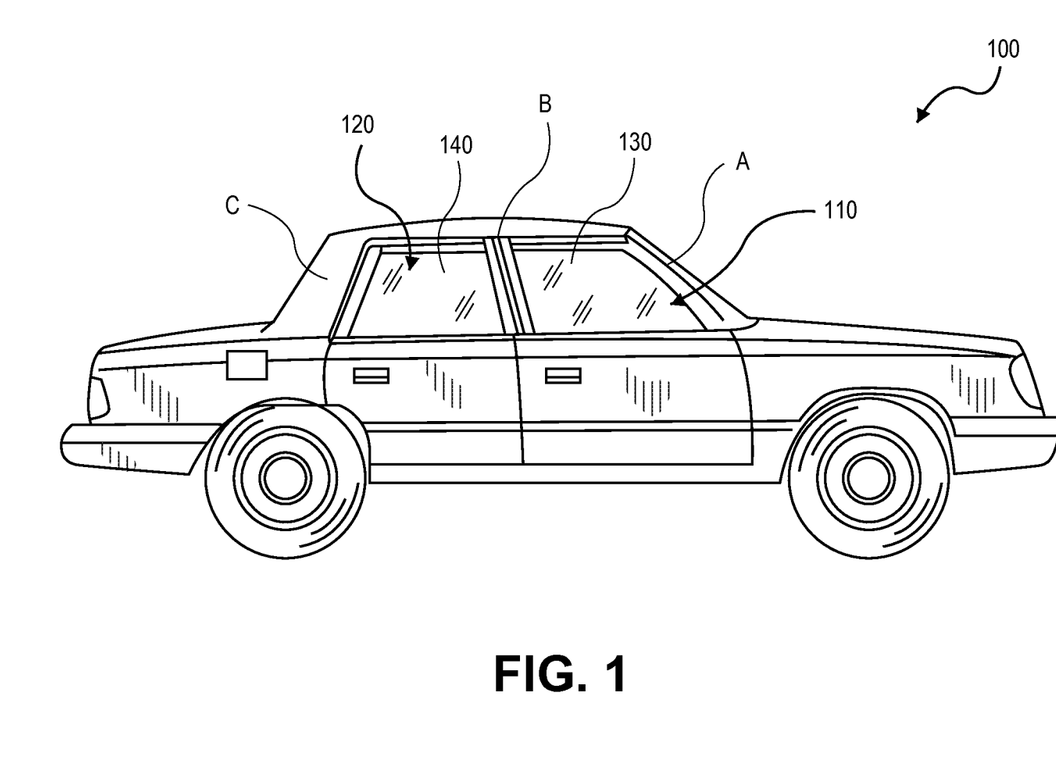
FIG. 1 illustrates an exemplary vehicle having various components which may be decoratively covered by an applique assembly according to aspects of the disclosure.

Applique assemblies may be used in a wide range of applications in accordance with various aspects of the disclosure. For example, applique assemblies may be used in various decorative applications such as coverings for exterior surfaces of vehicles including, but not limited to, cars, trucks, buses, and boats. The applique assemblies may, in some embodiments, be incorporated as outer coverings for vehicle pillars or other support structures. FIG. 1 illustrates an exemplary vehicle 100, which includes front and rear assemblies 110 and 120, having front and rear windows 130 and 140. The vehicle 100 further comprises a forward pillar A, conventionally referred to as an A-pillar, a rear pillar C, conventionally referred to as a C-pillar, and a center pillar B, located between the front and rear windows 130 and 140 and conventionally referred to as a B-pillar. According to various non-limiting embodiments, the applique assemblies disclosed herein can be used as decorative covers for any of the pillars A, B, and/or C. Of course, applique assemblies according to the instant disclosure can also be applied to other portions of the vehicle, such as the roof, e.g., between the windshield top edge and the glass roof elements found in a sunroof or panoramic roof, to name a few.

Figure 2A:
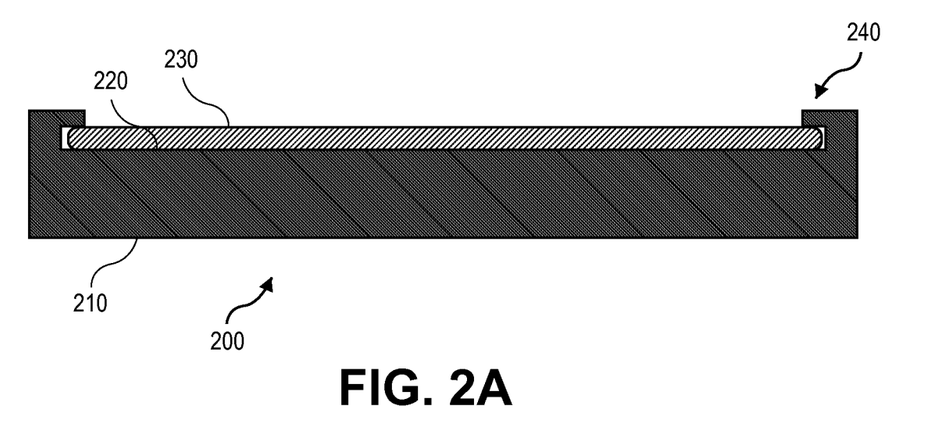
FIG. 2A is an end view of an applique assembly in accordance with various aspects of the disclosure.
Figure 2B:
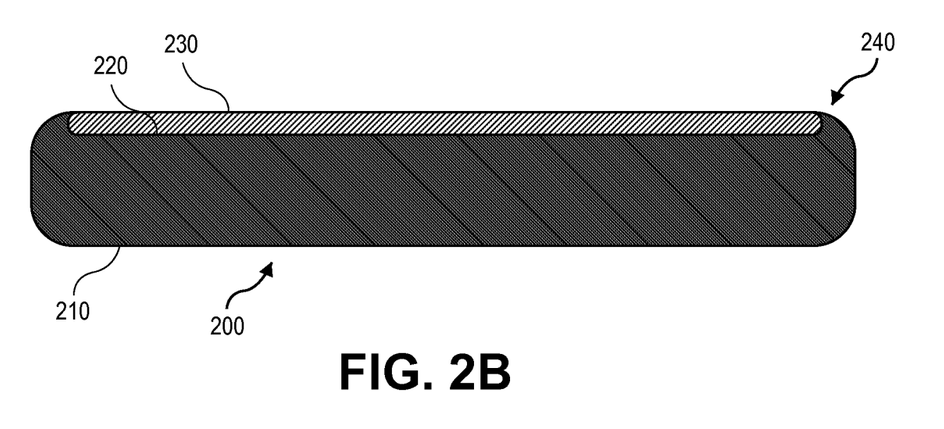
FIG. 2B is an end view of an applique assembly in accordance with aspects of the disclosure.

FIGS. 2A and 2B illustrate side views of exemplary applique assemblies 200 according to the disclosure. The applique assembly 200 can comprise a substrate 210 comprising a first non-planar surface 220 defining a recess in which a glass sheet 230, having a thickness less than about 3 mm, is configured to fit. For example, the recess may comprise a groove, channel, or lip 240 having a depth substantially equal to, e.g., marginally larger than, the thickness of the glass sheet 230. The groove, channel, or lip 240 may extend fully or partially around the edge of the recess and may have any shape. For example, it may have a rectangular edge as shown in FIG. 2A, or a smooth edge as shown in FIG. 2B, or any other shape suitable to retain the glass sheet 230.

Figure 3A:
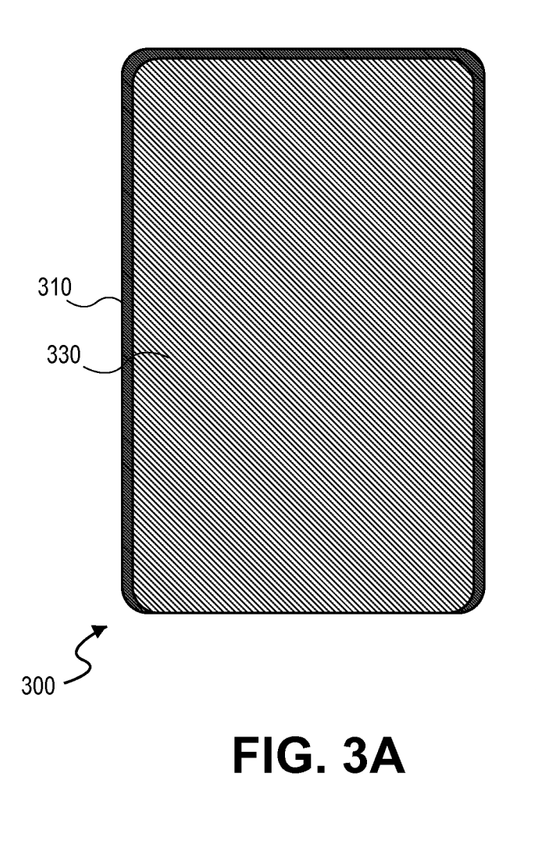
FIG. 3A is a top view of an applique assembly in accordance with aspects of the disclosure.
Figure 3B:
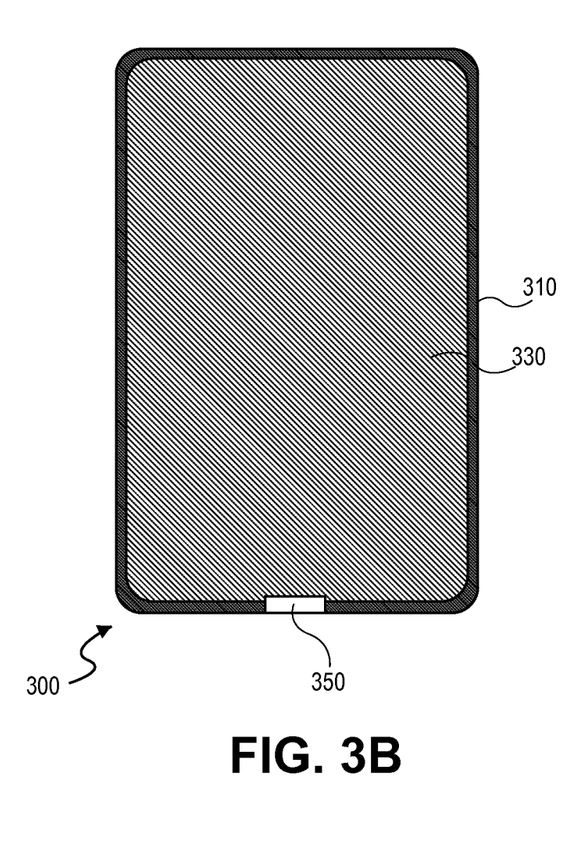
FIG. 3B is a top view of an applique assembly in accordance with aspects of the disclosure.

As shown in FIG. 3A, which illustrates a top view of an exemplary applique assembly 300, the glass sheet 330 can cover a majority of the substrate 310 except for a narrow band around the edge, which may optionally comprise a groove, channel, or lip. In certain embodiments, the recessed area may be maximized and the groove, channel, or lip area of the substrate may be minimized such that as much of the exterior surface of the assembly as possible is covered by glass. The glass sheet 330 can, by way of non-limiting example only, be positioned in, e.g. slid into, a recess provided in the substrate 310 and held in place, such as by frictional forces. For instance, as shown in FIG. 3A, the glass sheet 330 may be retained by a groove, channel, or lip on three sides. In the illustrated non-limiting embodiment, the glass sheet 330 may be inserted into the applique assembly from the bottom side. Alternatively, as illustrated in FIG. 3B, a retention feature 350, such as a ridge or raised portion in the substrate, may be provided to hold the glass sheet 330 in place. In such instances, the glass sheet 330 may be slid over the retention feature 350 during assembly, the retention feature capable of being subsequently snapped up or otherwise fastening the fourth edge of the glass in place to provide additional stability. It is also envisioned that the glass sheet 330 may cover less than a majority of the substrate 310 according to further embodiments.

The glass sheet once positioned in the substrate recess can be in a bent, non-planar state which can create friction between the substrate and glass elements sufficient to hold the glass in place without the need for an adhesive or lamination. Thus, in some embodiments, the applique assembly does not comprise an adhesive layer between the substrate and the glass sheet and/or the substrate is not laminated to the glass sheet. It is to be understood that an adhesive layer attaching the glass sheet to the substrate is to be distinguished from an adhesive layer attaching an optional film or element (such as an anti-splinter film, decorative film, or functional element) to the glass sheet, which is discussed in more detail below. Thus, in some embodiments, the applique assembly may not comprise an adhesive layer attaching the glass sheet to the substrate, but may comprise an adhesive layer attaching a different film, layer, or element to the glass sheet. In other embodiments, the glass sheet may be adhered or laminated to the substrate.

Figure 4:
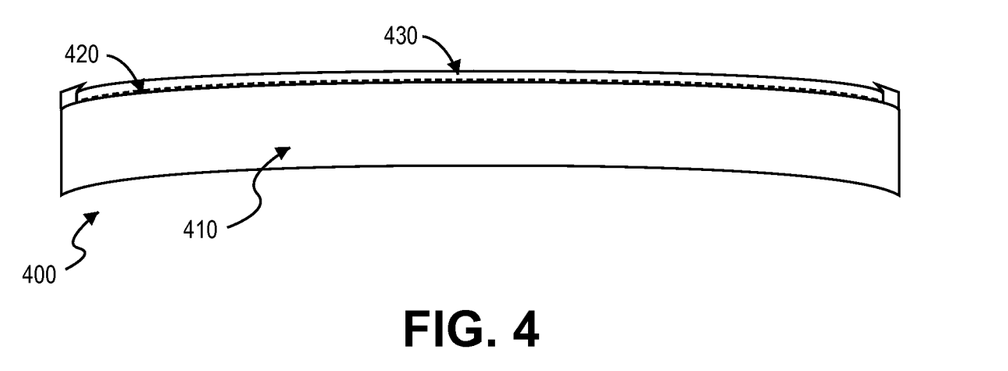
FIG. 4 is a side view of an applique assembly in accordance with aspects of the disclosure.

FIG. 4 presents a cross-sectional side view of an exemplary applique assembly 400, demonstrating that the top surface of the substrate 410 is not flat, e.g., the substrate 410 comprises a non-planar surface 420. The glass sheet 430 can be shaped to conform to the curvature of the non-planar surface 420. As used herein, the term "conform" is intended to denote that the glass sheet is shaped or molded so as to match or substantially match the shape or curvature of the non-planar surface of the substrate. In this manner, the exterior surface of the glass sheet can be substantially even with the surrounding local regions of the vehicle, e.g., the surrounding glass windows of the vehicle.

Figure 5:
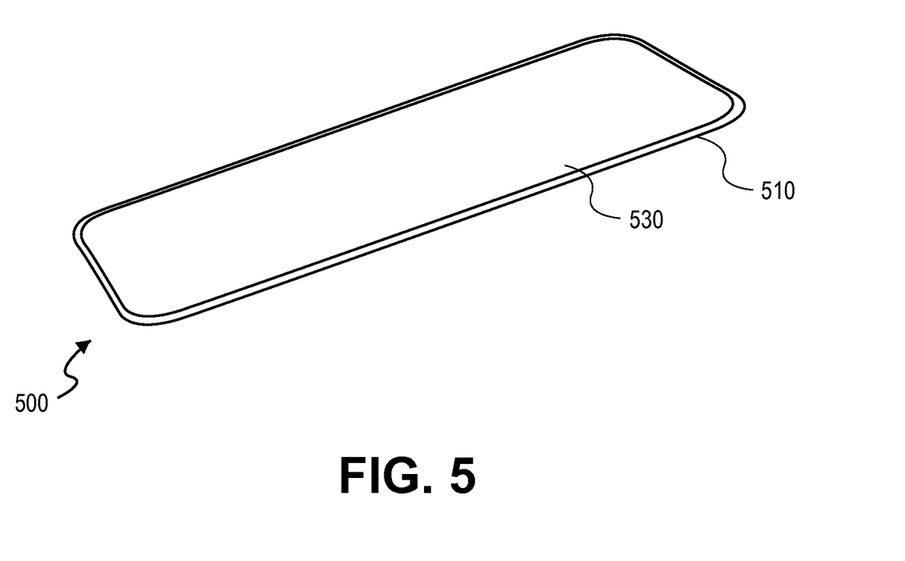
FIG. 5 is an oblique view of an applique assembly in accordance with aspects of the disclosure.

FIG. 5 presents yet another view of an exemplary applique assembly 500 as viewed from an oblique angle, illustrating a substrate 510 and a glass sheet 530 fit within a recess in the substrate.

The thickness of the applique assembly may vary depending on the particular application. Relatively thin substrates and/or glass sheets may be used in various applications to reduce material costs and/or weight of the applique assembly, while still providing sufficient strength. In further embodiments, relatively thick substrates and/or glass sheets may be used in applications where further support is desired to maintain the mechanical integrity of the applique assembly. The substrate thickness may, in at least certain embodiments, be a function of the glass thickness. For example, a thinner glass sheet may be held in place by a thinner substrate or a thicker glass sheet may be fit with a thicker substrate. By way of non-limiting embodiment, a metal substrate may have a thickness substantially equal to or greater than the thickness of the glass sheet. A plastic substrate may, in certain embodiments, have a thickness substantially equal to or greater than the thickness of the glass sheet, such as about two or three times thicker than the glass sheet. In various embodiments, the applique assembly may have a thicknesses ranging from about 0.2 mm to about 10 mm, such as from about 0.5 mm to about 8 mm, from about 1 mm to about 6 mm, from about 2 mm to about 5 mm, or from about 3 mm to about 4 mm, including all ranges and subranges therebetween. Other thicknesses may be provided depending on the particular application.

The applique assembly can include a substrate comprising a wide range of materials and/or a wide range of thicknesses and configurations. For instance, the substrate may be chosen from metals, such as steel, cold rolled steel, aluminum or any other suitable metal. In other embodiments, the substrate may be chosen from plastics, such as molded or extruded plastic elements of various shapes and sizes. Of course, any other suitable substrate material used in the industry can be employed as a substrate in an exemplary applique assembly and the aforementioned examples should not limit the scope of the claims appended herewith.

As illustrated in the figures, the substrate can include a first non-planar surface having any desired shape. In certain embodiments, the non-planar surface will have a curvature matching the shape of the exterior surface to be covered. The applique assembly can then be used to create the appearance of a smooth, continuous exterior surface which conforms to the surrounding topography of the vehicle and matches the desired curvature of the local vehicle surface. The glass sheet recessed in the substrate can therefore be shaped, e.g., cold formed, to conform to, or assume a shape similar to that of the non-planar surface of the substrate.

The glass sheet may be chosen so as to be thin enough to enable it to conform to the non-planar surface of the substrate, yet strong enough not to break when so formed. The shaping of flat glass sheets to form a non-flat (or non-planar) shape, without raising the temperature of the glass to its softening point is known as "cold-forming" or "cold-bending." When cold-forming glass, the force required to bend the glass out of plane will be converted to stress in the glass. The glass should possess sufficient strength to absorb this additional stress in addition to the strength necessary to provide whatever function the application requires. The stiffness of a sheet of glass is proportional to the cube of its thickness, thus a much greater force may be needed to bend a thicker sheet of glass than a thinner sheet of glass to the same radius. In the case of cold-forming, thin glass has the advantage of generating a much lower internal stress when bent to a particular shape or radius.

Use of a chemically-strengthened glass, such as Corning® Gorilla® glass may, in certain embodiments, enable the glass sheet to be very thin, e.g., less than 1 mm, while still possessing high strength to withstand the cold-bending process. Conventional glass, such as soda lime glass cannot be fully strengthened via thermal tempering unless it is comparatively thick, e.g., greater than 3 mm (such as 3-5 mm), which is too thick to bend into a non-planar shape by cold-bending processes and would require a thermal shaping process to achieve the desired shape. Thinner soda lime glass may be easier to bend using cold processing methods, but can be thermally tempered to only several tens of MPa of compressive stress. Thus, conventional soda lime glasses fail to provide both the necessary thinness and strength required to be shaped in cold-bending processes to produce applique assemblies with the desired weight and cost parameters.

The applique assembly disclosed herein can include a chemically strengthened or non-chemically strengthened glass sheet having a thickness of less than about 3 mm, such as about 2 mm or less, or about 1 mm or less, including all ranges and subranges therebetween. In certain embodiments, the glass sheet may have a thickness ranging from about 0.1 mm to about 2 mm, from about 0.3 mm to about 1.5 mm, or from about 0.5 mm to about 1 mm, including all ranges and subranges therebetween. In one non-limiting embodiment, the glass sheet may have a thickness of about 0.7 mm. In another embodiment, the glass sheet may have a thickness of about 1 mm. In a further embodiment, the glass sheet may have a thickness of about 0.3 mm. According to yet a further embodiment, the glass sheet may have a thickness of about 0.1 mm. The glass sheet may comprise, according to various embodiments, a glass such as aluminosilicate, alkali-aluminosilicate, borosilicate, alkali-borosilicate, aluminoborosilicate, or alkali-aluminoborosilicate glasses, or any other suitable glass.

Various glass forming techniques may be used to produce glass sheets that may be incorporated within the applique assembly. For instance, fusion down draw techniques, fusion updraw techniques, slot draw techniques, float techniques, or other processes may be used to provide a glass ribbon that may be processed into glass sheets having the desired dimensional configuration. For example, a fusion draw process can be provided to obtain a substantially pristine surface. According to certain embodiments, the glass sheet can be chosen from clear, opaque, and colored glasses.

In one embodiment, the glass sheets can comprise chemically strengthened glass such as Corning® Gorilla® glass from Corning Incorporated. Such chemically strengthened glass, for example, may be provided in accordance with U.S. Pat. Nos. 7,666,511, 4,483,700, and 5,674,790, which are incorporated herein by reference in their entireties. Corning® Willow™ glass and Corning® EAGLE XG® glass from Corning Incorporated may also be suitable for use as the glass sheet in various embodiments. Of course, glasses from other manufacturers, such as Xensation® from Schott and Dragontrail™ from Asahi Glass Company, can also be used, to name a few.

Chemical strengthening may be carried out by an ion exchange process. For instance, a glass sheet (e.g., aluminosilicate glass, alkali-aluminoborosilicate glass) may be made by fusion drawing and then chemically strengthening by immersing the glass sheet in a molten salt bath for a predetermined period of time. Ions within the glass sheet at or near the surface of the glass sheet are exchanged for larger metal ions, for example, from the salt bath. The temperature of the molten salt bath and treatment time period will vary; however, it is within the ability of one skilled in the art to determine the time and temperature according to the desired application. By way of a non-limiting example, the temperature of the molten salt bath may range from about 400° C. to about 800° C., such as from about 400° C. to about 500° C., and the predetermined time period may range from about 1 to about 24 hours, such as from about 4 hours to about 10 hours, although other temperature and time combinations are envisioned.

Without wishing to be bound by theory, it is believed that the incorporation of the larger ions into the glass strengthens the sheet by creating a compressive stress in a near surface region. A corresponding tensile stress is induced within a central region of the glass sheet to balance the compressive stress. The chemical strengthening process of Corning® Gorilla® glass can provide a relatively high compressive stress (e.g., greater than about 500 MPa, such as from about 700 MPa to about 730 MPa; and even capable of greater than 800 MPa) with a relatively deep depth of layer which is in compression (e.g., about 40 to 50 microns; and even capable of greater than 100 microns). Such glass can have a high retained strength and high resistance to scratch damage, high impact resistance, and/or high flexural strength as well as a substantially pristine surface.

According to various embodiments, the glass sheet may have a compressive stress greater than about 100 MPa and a depth of layer of compressive stress (DOL) greater than about 10 microns. In further embodiments, the glass sheet may have a compressive stress greater than about 500 MPa and a DOL greater than about 20 microns. In still further embodiments, the glass sheet may have a compressive stress greater than about 700 MPa and a DOL greater than about 40 microns. The glass sheets employed in the applique assemblies disclosed herein can have enough strength to allow bending by a cold-forming process while still possessing enough residual strength to withstand damage such as scratching, abrading, and/or breakage.

Figure 6A:
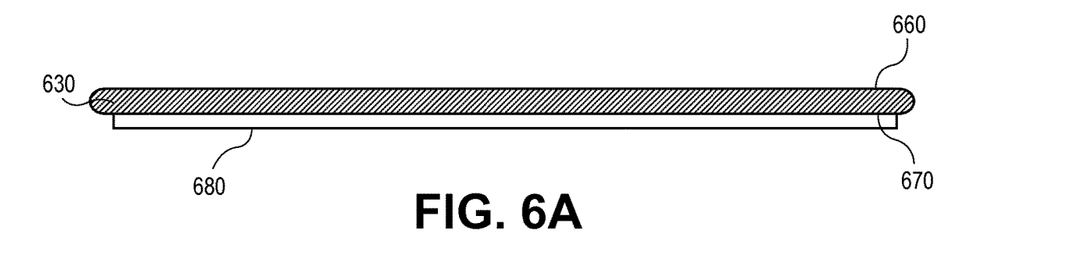
FIG. 6A is an end view of an applique sub-assembly in accordance with aspects of the disclosure.
Figure 6B:
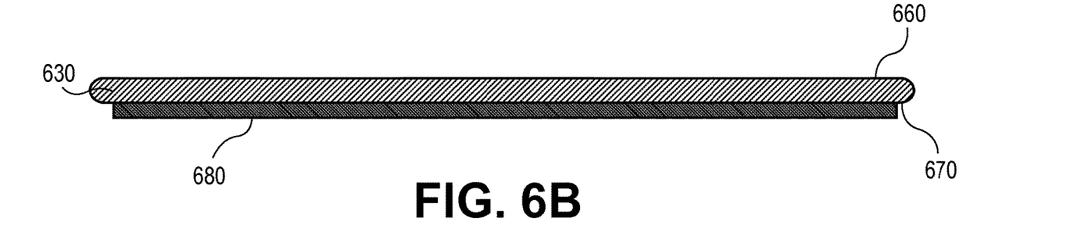
FIG. 6B is an end view of an applique sub-assembly in accordance with aspects of the disclosure.
Figure 6C:
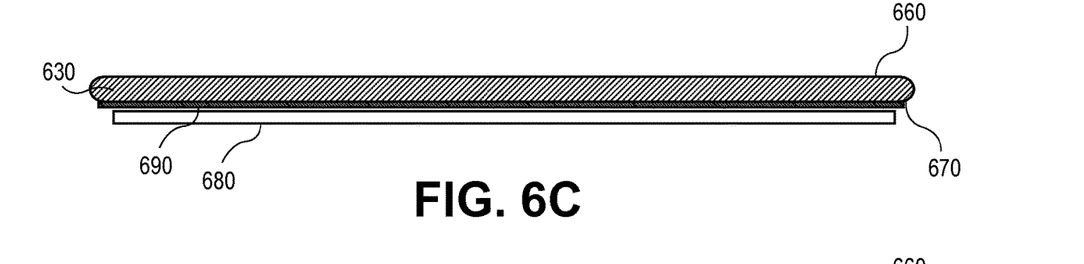
FIG. 6C is an end view of an applique sub-assembly in accordance with aspects of the disclosure.
Figure 6D:
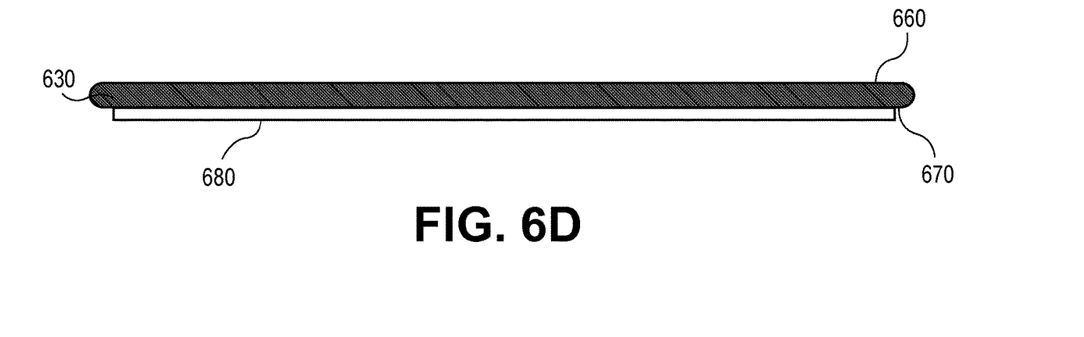
FIG. 6D is an end view of an applique sub-assembly in accordance with aspects of the disclosure

The applique assemblies disclosed herein may comprise one or more additional layers and/or films, such as an anti-splinter film (ASF) material, which may retain the glass fragments in the event of breakage. ASF materials include, by way of a non-limiting example, plastic films with an adhesive layer. As illustrated in FIGS. 6A-B, the glass sheet 630 may comprise a first surface 660 and a second surface 670, with an ASF film 680 on the second surface 670. In FIG. 6A, the ASF film 680 is clear, e.g., not colored, such that the exterior surface of the applique assembly has the same color as the underlying substrate (not shown). In FIG. 6B, the ASF film 680 is colored and, in some embodiments, the color may be chosen so as to match the exterior surface of the applique assembly to the color of the surrounding glass. In FIG. 6C, a colored decorative layer 690, such as paint or another colored material or interlayer, e.g., a polyvinyl butyrate (PVB) material, ethylene vinyl acetate (EVA), acoustic PVB, thermoplastic polyurethane (TPU), an ionomer, etc., may be provided on the second surface 670 of the glass sheet 630, e.g., between the glass sheet 630 and an ASF film 680. In this embodiment, the exterior surface of the applique assembly will exhibit the pattern and/or color of the underlying decorative layer 690. FIG. 6D illustrates an exemplary embodiment where the glass sheet 630 is colored, with an ASF film 680 on the second surface 670 which may, e.g., be clear. This embodiment may be desirable when the surrounding glass itself is colored, such that the applique assembly with a colored glass surface can be chosen to match the vehicle glass. These and other related embodiments may allow for decorative and functional appliques which can be custom designed as desired by the manufacturer or consumer.

Functional or other decorative elements may also be employed within or in conjunction with the applique assemblies disclosed herein. For example, a lighting element may be employed. In one exemplary and non-limiting embodiment, a message may be created on the applique by printing or laminating a solid color on a surface of the glass, e.g., the interior surface of the glass, and not printing the color in the area of the message. When lit from behind, such as by a light bulb or LED, the message may become visible. Alternatively, a decorative lighting element may be provided by a light source within or behind the applique assembly, which can shine through a transparent or semi-transparent portion of a decoration, pattern, or color on the glass sheet. These lighting effects can be decorative in nature or can serve as an indicator to the passenger, for instance, to notify a passenger that a door is ajar. The space between the applique assembly and the vehicle frame can also, in other embodiments, be utilized to store an antenna or other functional element. For example, an antenna can be affixed within the assembly or can be created by an electrically-conductive material on one or more surfaces of the assembly.

In additional embodiments, an applique assembly may be configured with a sensor, indicator, or active device. For example, a touch pad and the associated electronics may be provided in an underlying substrate or may be provided in an intermediate interlayer whereupon a cold formed glass sheet can provided directly adjacent to the touch pad. Due to the thinness of the glass sheet, a user can interface with the touch pad and, for example, input a code to unlock a car door, provide instructions to a microprocessor remote from the respective pillar, etc. Thus, embodiments described herein can be used both for their lightweight capabilities as well as their tactile capabilities.

The applique assembly may be configured for mounting, e.g., on a vehicle exterior surface. For instance, the substrate may have a second surface comprising one or more features which can engage or attach to a vehicle body. These features may for example, be molded into the substrate itself, or can be affixed by adhesives or physical fasteners, such as clips or screws. The applique assembly can be further stabilized or fastened to the exterior of the vehicle by adhesive mounting strips or other adhesive materials known in the automotive industry.

Applique assemblies of the present disclosure may have a number of advantages over conventional appliques, e.g., metal/plastic appliques or appliques employing soda lime glass. For example, applique assemblies of the present disclosure may cover vehicle structural elements while also matching the appearance of the surrounding glass windows, as both areas would exhibit a glass surface, which cannot be achieved using, e.g., painted metal/plastic appliques. In addition, the applique assemblies of the present disclosure may provide enhanced durability as compared, e.g., to vinyl or painted plastic, thus preserving the quality of the surface for extended periods of exposure to environmental elements.

As compared to appliques employing thicker, thermally-tempered soda lime glass, chemically strengthened glass can be much thinner while still providing the desired strength characteristics, thus providing weight savings which can improve fuel efficiency, decrease emissions, and/or lower the center of gravity of the vehicle. Additionally, these thinner glasses can be cold-formed to achieve a desired shape, rather than the more costly thermal forming process required for thicker glasses such as soda lime. Cold formed glass surfaces can also exhibit superior pristine surface qualities compared to thermally formed and tempered thick glass. Chemically strengthened glasses such as Corning® Gorilla® glass can also possess a much high compressive stress and deeper depth of layer than thin soda lime glasses, which allows them to better withstand damage such as scratching and breakage. Furthermore, whereas tempered soda lime glasses may release glass chips to the surrounding environment when broken, chemically strengthened glasses such as Corning® Gorilla® glass, or thin glass sheets coated with ASF layers as disclosed herein may be able to retain glass fragments in place in case of breakage.

The applique assemblies disclosed herein can employ a glass sheet held in place within the recess of the substrate by frictional forces, thereby eliminating the need to laminate or adhere the glass sheet to the substrate, which can reduce production cost and time. In addition, because the glass sheet is not laminated to the underlying substrate, if the glass is broken during use, the glass sheet can be slid out and replaced with a new glass sheet, thereby simplifying the repair process.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a light source" includes examples having two or more such light sources unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, "substantially equal" is intended to denote that two values are equal or approximately equal, such as within about 5% of each other, or within about 2% of each other. In some embodiments, "substantially similar" is intended to denote, e.g., that one element is approximately the same shape as another element.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an assembly that comprises A+B+C include embodiments where an assembly consists of A+B+C and embodiments where an assembly consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An applique assembly comprising:
   a substrate comprising a first non-planar surface and a second surface, the first non-planar surface comprising a groove defining a recess, the groove extending at least partially around an edge of the recess; and
   a glass sheet having a thickness of less than about 3 mm and located within the recess;
   wherein the groove has a depth substantially equal to the thickness of the glass sheet,
   wherein the glass sheet is formed into the recess via a cold-forming process to conform to the first non-planar surface, the glass sheet comprising a bending stress that is imparted by the cold-forming process, at least a portion of the glass sheet being retained by the groove, and
   wherein the second surface of the substrate is configured to attach to an exterior surface of a vehicle such that the applique assembly covers at least part of a structural frame of the vehicle.

2. The applique assembly of claim 1, wherein the substrate comprises a plastic substrate, a molded plastic substrate, an extruded plastic substrate, or a metal substrate.

3. The applique assembly of claim 1, wherein the assembly does not comprise an adhesive layer attaching the substrate to the glass sheet.

4. The applique assembly of claim 1, wherein the glass sheet is selected from the group consisting of an aluminosilicate glass, an alkali-aluminosilicate glass, a borosilicate glass, an alkali-borosilicate glass, an aluminoborosilicate glass, and an alkali-aluminoborosilicates glass.

5. The applique assembly of claim 1, wherein the glass sheet is chemically strengthened.

6. The applique assembly of claim 1, wherein the glass is chosen from clear, colored, and opaque glasses.

7. The applique assembly of claim 1, wherein the glass sheet has a thickness ranging from about 0.1 mm to about 2 mm.

8. The applique assembly of claim 1, wherein the glass sheet has a thickness ranging from about 0.5 mm to about 1.5 mm.

9. The applique assembly of claim 1, wherein the glass sheet has a compressive stress greater than about 100 MPa and a depth of layer of compressive stress greater than about 10 microns.

10. The applique assembly of claim 1, wherein the glass sheet has a compressive stress greater than about 700 MPa and a depth of layer of compressive stress greater than about 40 microns.

11. The applique assembly of claim 1, wherein the second surface is attached to a pillar of the vehicle.

12. The applique assembly of claim 1, further comprising at least one additional layer that is selected from the group consisting of clear and colored anti-splinter films, adhesive films, and decorative films.

13. The applique assembly of claim 1, further comprising at least one additional element that is selected from the group consisting of a light source, touch sensor, antennae, and combinations thereof.

14. An applique assembly comprising:
a substrate comprising a first non-planar surface and a second surface, the first non-planar surface comprising a groove defining a recess, the groove extending at least partially around an edge of the recess; and
a strengthened glass sheet having a thickness of less than about 3 mm and located within the recess;
wherein the groove has a depth substantially equal to the thickness of the glass sheet,
wherein the glass sheet is formed into the recess via a cold-forming process to conform to the first non-planar surface, the glass sheet comprising a bending stress that is imparted by the cold-forming process, at least a portion of the glass sheet being retained in the groove by frictional forces,
wherein the strengthened glass sheet comprises a compressive stress greater than about 100 MPa and a depth of layer of compressive stress greater than about 10 microns,
wherein the second surface of the substrate is configured to attach to an exterior surface of a vehicle, and
wherein the applique assembly is a decorative cover to cover at least part of a structural or functional element of the vehicle from view.

15. The applique assembly of claim 14, wherein the substrate comprises a metal or a plastic.

16. The applique assembly of claim 14, wherein the substrate has a thickness substantially equal to or greater than the thickness of the glass sheet.

17. The applique assembly of claim 14 having a thickness in the range from about 0.2 mm to about 10 mm.

\* \* \* \* \*

UNITED STATES PATENT AND TRADEMARK OFFICE
CERTIFICATE OF CORRECTION

| | | |
|---|---|---|
| PATENT NO. | : 10,549,704 B2 | Page 1 of 1 |
| APPLICATION NO. | : 15/324153 | |
| DATED | : February 4, 2020 | |
| INVENTOR(S) | : Michael James McFarland | |

It is certified that error appears in the above-identified patent and that said Letters Patent is hereby corrected as shown below:

On the Title Page

Page 2, Column 1, item [56], Line 1, delete "Forke, Jr. et al." and insert -- Forker, Jr. et al. --, therefor.

Page 2, Column 2, item [56], Line 32, delete "Clean et al." and insert -- Cleary et al. --, therefor.

Signed and Sealed this
Fourteenth Day of July, 2020

Andrei Iancu
*Director of the United States Patent and Trademark Office*